(12) United States Patent
Nakamura et al.

(10) Patent No.: US 10,948,412 B2
(45) Date of Patent: Mar. 16, 2021

(54) METHOD AND SYSTEM FOR SCREENING NANOPARTICLE, AND NANOPARTICLE AND METHOD OF PRODUCING THE SAME

(71) Applicants: NATIONAL INSTITUTE OF ADVANCED INDUSTRIAL SCIENCE AND TECHNOLOGY, Tokyo (JP); NS MATERIALS INC., Fukuoka (JP)

(72) Inventors: Hiroyuki Nakamura, Ibaraki (JP); Maki Saeki, Fukuoka (JP); Masanori Tanaka, Fukuoka (JP); Eiichi Kanaumi, Fukuoka (JP)

(73) Assignees: NATIONAL INSTITUTE OF ADVANCED INDUSTRIAL SCIENCE AND TECHNOLOGY, Tokyo (JP); NS MATERIALS INC., Fukuoka (JP)

( * ) Notice: Subject to any disclaimer, the term of this patent is extended or adjusted under 35 U.S.C. 154(b) by 280 days.

(21) Appl. No.: 15/755,716

(22) PCT Filed: Aug. 19, 2016

(86) PCT No.: PCT/JP2016/074273
§ 371 (c)(1),
(2) Date: Feb. 27, 2018

(87) PCT Pub. No.: WO2017/038511
PCT Pub. Date: Mar. 9, 2017

(65) Prior Publication Data
US 2019/0025211 A1    Jan. 24, 2019

(30) Foreign Application Priority Data

Aug. 28, 2015 (JP) .............................. JP2015-169736
Aug. 28, 2015 (JP) .............................. JP2015-169739

(51) Int. Cl.
*G01N 21/64* (2006.01)
*G01N 21/62* (2006.01)
(Continued)

(52) U.S. Cl.
CPC .......... *G01N 21/6428* (2013.01); *C09K 11/06* (2013.01); *C09K 11/565* (2013.01);
(Continued)

(58) Field of Classification Search
CPC ............... G01N 21/6428; G01N 21/31; G01N 21/3103; G01N 21/6489;
(Continued)

(56) References Cited

U.S. PATENT DOCUMENTS

2002/0048610 A1   4/2002  Cima et al.
2002/0098518 A1   7/2002  Levinson
(Continued)

FOREIGN PATENT DOCUMENTS

EP    1431352 A1    6/2004
JP    7-081936      3/1995
(Continued)

OTHER PUBLICATIONS

International Search Report for PCT/JP2016/074273, dated Nov. 8, 2016.
(Continued)

*Primary Examiner* — Brian J. Sines
(74) *Attorney, Agent, or Firm* — Greenblum & Bernstein, P.L.C.

(57) ABSTRACT

Particularly provided is a method and a system for screening nanoparticles which allow effective search of conditions for surface modification of nanoparticles and reduction in the time, the labor, and the amount of a sample required for the surface modification compared with conventional techniques. The method for screening nanoparticles includes the (Continued)

steps of: dividing a nanoparticle suspension for a respective plurality of containers provided in a containment receptacle; performing surface modification on nanoparticles under different conditions for the respective containers; preparing evaluation samples by adding a dispersion medium into each container and mixing the nanoparticles and the dispersion medium; and performing evaluation on the evaluation sample in each container by optical analysis.

6 Claims, 2 Drawing Sheets

(51) Int. Cl.
    *G01N 21/31*           (2006.01)
    *G01N 21/27*           (2006.01)
    *C09K 11/00*           (2006.01)
    *C09K 11/06*           (2006.01)
    *C09K 11/56*           (2006.01)
    *C09K 11/88*           (2006.01)

(52) U.S. Cl.
    CPC ............ *C09K 11/883* (2013.01); *G01N 21/31* (2013.01); *G01N 21/3103* (2013.01); *G01N 21/6489* (2013.01); *G01N 2021/6439* (2013.01)

(58) Field of Classification Search
    CPC ........... G01N 2021/6439; G01N 21/64; G01N 21/27; G01N 21/62; C09K 11/06; C09K 11/565; C09K 11/883; C09K 11/08; C09K 11/00; B82Y 20/00; B82Y 35/00
    See application file for complete search history.

(56) References Cited

U.S. PATENT DOCUMENTS

| | | |
|---|---|---|
| 2002/0177167 A1 | 11/2002 | Levinson et al. |
| 2003/0059837 A1 | 3/2003 | Levinson et al. |
| 2003/0123057 A1 | 7/2003 | Lemmo et al. |
| 2004/0072427 A1* | 4/2004 | Sato .......................... C09C 1/10 438/689 |
| 2004/0146434 A1* | 7/2004 | Kane ..................... B01L 3/0217 422/534 |
| 2005/0051771 A1* | 3/2005 | Sato .......................... C09C 1/00 257/40 |
| 2005/0170530 A1* | 8/2005 | Sato ........................ C09K 11/02 438/1 |
| 2005/0235740 A1* | 10/2005 | Desie ................... B01J 19/0046 73/53.01 |
| 2007/0087197 A1* | 4/2007 | Jang ...................... C09K 11/883 428/403 |
| 2010/0179310 A1 | 7/2010 | Kamme et al. |
| 2011/0017951 A1* | 1/2011 | Ryowa ................. C09K 11/623 252/301.16 |
| 2012/0301971 A1* | 11/2012 | Murase ................ C09K 11/565 436/172 |
| 2015/0179900 A1* | 6/2015 | Pickett ................. C09K 11/565 438/763 |
| 2015/0315463 A1* | 11/2015 | Morishita ............ C09K 11/621 257/13 |
| 2016/0178621 A1 | 6/2016 | Gouda et al. |
| 2016/0251680 A1 | 9/2016 | Quinn et al. |

FOREIGN PATENT DOCUMENTS

| | | |
|---|---|---|
| JP | 2002-332477 | 11/2002 |
| JP | 2003-519698 | 6/2003 |
| JP | 2005-325353 | 11/2005 |
| JP | 2006-76831 | 3/2006 |
| JP | 2012-514477 | 6/2012 |
| WO | 2012/161065 | 11/2012 |
| WO | 2014/203614 | 12/2014 |
| WO | 2015/069469 | 5/2015 |

OTHER PUBLICATIONS

"Palladium nanoparticles stabilised by polyfluorinated chains;" Marcial Moreno-Manas et al., Chem. Commun. (2002) pp. 60-61.

"Fabrication of superhydrophobic surfaces with perfluorooctanoic acid modified $TiO_2$/polystyrene nanocomposites coating;" XiangHui Xu et al.; Colloids and Surfaces A: Physicochemical and Engineering Aspects, 341 (2009) pp. 21-26.

* cited by examiner

METHOD AND SYSTEM FOR SCREENING NANOPARTICLE, AND NANOPARTICLE AND METHOD OF PRODUCING THE SAME

TECHNICAL FIELD

The present invention relates to a screening method and a screening system which make it possible to effectively search conditions for surface modification of nanoparticles. The present invention also relates to surface-modified nanoparticles and a method of producing the same.

BACKGROUND ART

In recent years, quantum dots (QDs) attracting attentions as fluorescent materials have been put into practical applications such as electronic devices and in vivo fluorescence labeling and are intensively studied at present.

Quantum dots are seldom used alone and mostly used in combination with other materials; for example, quantum dots may be dispersed in resins. With this being the case, in order to improve their dispersibility in other materials, quantum dots need to be subjected to surface modification suitable for the dispersion. JP 2006-076831 A (PTL 1) describes polymer-modified metal sulfide nanoparticles which are easily dispersed in solutions and resins.

CITATION LIST

Patent Literature

PTL 1: JP 2006-076831 A

SUMMARY OF INVENTION

Technical Problem

However, actual surface modification on quantum dots for achieving effective dispersibility in a dispersion medium involves various combinations of conditions such as the kind and the concentration of a surface modifier (surfactant), the quantum dot concentration, etc. depending on the dispersion medium. Accordingly, significant time and labor have been expended in searching conditions.

Since the production process of quantum dots under development is incomplete and inconsistent, usually small amount of such quantum dots can be used as samples. Accordingly, it is difficult to systematically test many surface modification conditions.

The invention according to PTL 1 does not describe a method of searching conditions for surface modification of quantum dots.

Another problem with conventional quantum dots is that they cannot be appropriately dispersed in CFC-based solvents (including resin solution). PTL 1 does not describe surface modification for achieving good dispersibility of quantum dots in CFC-based solvents.

The present invention particularly seeks to provide a method and a system for screening nanoparticles which allow effective search of conditions for surface modification of nanoparticles and reduction in the time, the labor, and the amount of a sample required for the surface modification compared with conventional techniques.

The present invention also particularly seeks to provide nanoparticles having better dispersibility in CFC-based solvents achieved by optimizing the surface modifier used and a method of producing the nanoparticles.

Solution to Problem

A method for screening nanoparticles according to the present invention includes the steps of: dividing a nanoparticle suspension for a respective plurality of containers provided in a containment receptacle; performing surface modification on nanoparticles under different conditions for the respective containers; preparing evaluation samples by adding a dispersion medium into each container and mixing the nanoparticles and the dispersion medium; and performing evaluation on the evaluation sample in each container by optical analysis.

A system for screening nanoparticles according to the present invention includes a containment receptacle and a plurality of containers provided in the containment receptacle. A nanoparticle suspension is divided for the respective plurality of containers, nanoparticles are surface-modified under different conditions for the respective containers, a dispersion medium is added into each container to prepare evaluation samples in which the nanoparticles are mixed with the dispersion medium, and the evaluation sample in each container is evaluated by optical analysis.

Nanoparticles of the present invention are surface-modified by at least one surface modifier selected from the group consisting of fluorobenzenethiol-based, fluoroalkyl alcohol-based, perfluorocarboxylic acid-based, fluoroalkanethiol-based, fluoroalkyl amine-based, and fluoroalkyl ester-based modifiers.

A method for producing nanoparticles according to the present invention includes the steps of: producing nanoparticles; and surface-modifying the nanoparticles by adding at least one surface modifier selected from the group consisting of fluorobenzenethiol-based, fluoroalkyl alcohol-based, perfluorocarboxylic acid-based, fluoroalkanethiol-based, fluoroalkyl amine-based, and fluoroalkyl ester-based modifiers.

Advantageous Effect of Invention

According to the present invention, for example, experimental conditions can be studied using a large number of evaluation samples at a time. Further, a certain treatment for surface modification can be uniformly performed on a large number of evaluation samples divided in a containment receptacle at a time. Thus, using a smaller amount of samples compared with conventional techniques, the present invention can reduce the time required for searching surface modification conditions and facilitate controlling the conditions and evaluations, thus effectively reducing labor.

According to the present invention, good dispersibility of surface-modified nanoparticles in CFC-based solvents can be achieved. Further, the present invention can increase the fluorescence intensity of nanoparticles.

DESCRIPTION OF EMBODIMENTS

Figure 1:
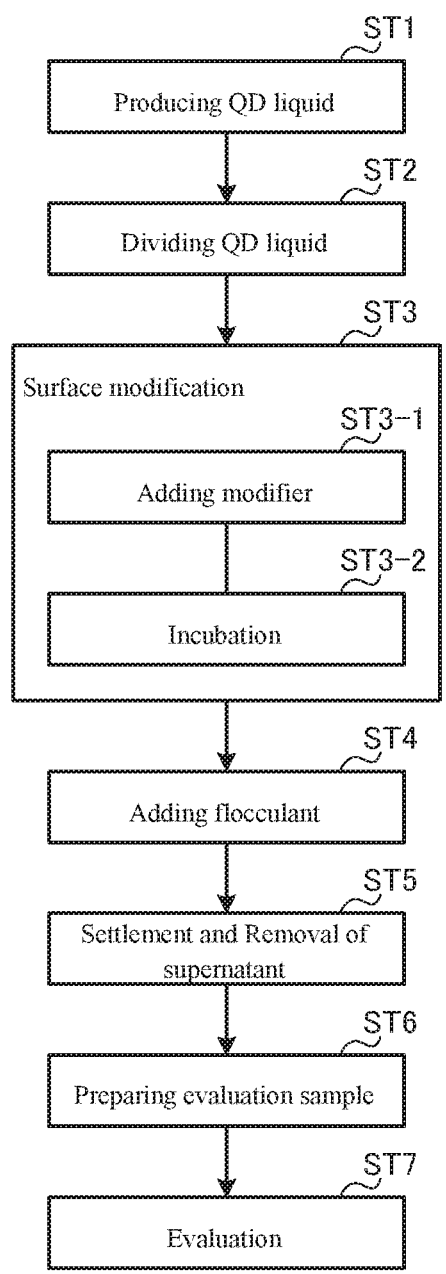
FIG. 1 is a flowchart showing a method for screening nanoparticles according to an embodiment of the present invention.

An embodiment of the present invention (hereinafter simply referred to as an "embodiment") will now be described in detail. Note that the present invention is not limited to the following embodiments, and various modifications may be made without departing from the spirit of the present invention.

Nanoparticles of this embodiment are surface-modified by at least one surface modifier selected from the group consisting of fluorobenzenethiol-based, fluoroalkyl alcohol-based, perfluorocarboxylic acid-based, fluoroalkanethiol-based, fluoroalkyl amine-based, and fluoroalkyl ester-based modifiers. Here, "-based" used with an intention to include isomers and modified bodies of the materials.

Preferably, in the above surface modifiers, alkane alcohol forming the fluoroalkyl alcohol-based modifier is an octanol, carboxylic acid forming the perfluorocarboxylic acid-based modifier is an octanoic acid, alkanethiol forming the fluoroalkanethiol-based modifier is a decanethiol, alkane amine forming the fluoroalkyl amine-based modifier is an octylamine, alkane ester forming the fluoroalkyl ester-based modifier is an octyl propionate.

As demonstrated by the experimental results to be described, the above modifiers allow for better dispersibility of the surface-modified nanoparticles in CFC-based solvents and increase the fluorescence intensity of the nanoparticles.

A surface modifier is preferably selected from pentadecafluorooctylamine and tridecafluorooctyl propionate, since wide variations of surface modification conditions other than the kind of the surface modifier can be selected and the dispersibility in CFC-based solvents can be appropriately and easily improved.

The surface modification conditions for producing nanoparticles in this embodiment can be determined based on a method for screening nanoparticles to be described below. The screening method can be added to a series of steps in the production process of nanoparticles. Specifically, the order of the steps in a method for screening nanoparticles according to this embodiment may be screening—determining surface modification conditions—producing nanoparticles—surface modifying instead of producing nanoparticles—surface modifying. A method for screening nanoparticles will now be described.

A method for screening nanoparticles according to this embodiment includes the steps of: dividing a nanoparticle suspension for a respective plurality of containers in a containment receptacle; surface-modifying nanoparticles in the suspensions under different conditions; dispersing the nanoparticles in the suspensions by a dispersion medium to obtain evaluation samples; and evaluating the evaluation samples based on the absorption spectra and the fluorescence spectra.

For example, in this embodiment, a microwell plate having a large number of indentations (wells) is used to prepare a large number of evaluation samples for different surface modification conditions, thereby performing those and other steps followed by evaluation of these evaluation samples by optical analysis in a series.

FIG. 1 is a flowchart showing a method for screening nanoparticles according to an embodiment of the present invention.

In Step ST1 in FIG. 1, a nanoparticle suspension containing quantum dots (hereinafter referred to as a QD liquid) is produced. The quantum dots can be obtained by mixing compounds as raw materials of the constituent elements to produce a precursor solution, and allowing reaction of the precursor solution for example using a microreactor for synthesis. The quantum dots obtained by synthesis can be subjected to purification using a known method. The purified quantum dots can be mixed in a solvent to obtain a QD liquid. Examples of the solvent includes, but not limited to, for example, alcohols, ketone, toluene, and water.

Next, in Step ST2 shown in FIG. 1, the QD liquid obtained in Step ST1 is added portionwise into a large number of containers provided in a containment receptacles. For example, a microwell plate in which wells are arranged in a matrix as containers can be used as the containment receptacle. Thus, in this embodiment, a conventional microwell plate can be used to perform screening. Alternatively, a plate-like containment receptacle in which a plurality of detachable individual receptacles corresponding to wells are arranged may be used. The material of the containment receptacle used is preferably, but not limited to, glass. In particular, in terms of the step of incubation, the containment receptacle is preferably formed from a material having higher resistant to heat and chemicals than plastics. Further, it is preferred that the receptacle is covered with a lid or a film in order to prevent the solvent from evaporating during incubation and optical analysis. In particular, use of a cover coated with Teflon® in optical analysis prevents the accuracy of analysis from being reduced, since the cover is prevented from being corroded and whitened by the solvent. When the containment receptacle is formed from a highly heat resistant material, the QD liquid portions added into the containers can be subjected to substantially uniform heat treatment. This reduces the variation in the heating temperature, so that the evaluation samples can be evaluated with high accuracy.

The number of the containers arranged in the containment receptacle is preferably, but not limited to, specifically, 50 or more, more preferably 96 or more, still more preferably 150 or more. The volume of each container is, for example, 3.0 mL or less, preferably 1.5 mL or less. Since the viscosity of a monomer used as a dispersion medium is usually high, agitating a sample is difficult when the amount of the sample is excessively small. Therefore, the volume of the containers is 0.5 mL or more, preferably 1.0 mL or more. In experiments to be described below, a microwell plate in which 96 wells made of glass are provided in a plate-like holder made of plastic or aluminum is used.

The concentration of QDs added into each container can be calculated from the QD concentration actually intended to be achieved in the matrix and the amount added into the container. Specifically, the QD concentration is preferably 0.1% or more, more preferably 1% or more, still more preferably 10% or more. The amount of the QD liquid is several tens microliters or less (specifically, 50 µL or less), preferably 20 µL or less, more preferably 10 µL or less, still more preferably 5 µL or less. In this embodiment, since the amount of the QD liquid added into each of a plurality of preferably 50 or more containers is several ten microliters or less, preferably 20 µL or less, the total amount of QD liquid in the containment receptacle at a time can be as small as several milliliters or less. Accordingly, the amount of a reagent used for a condition can be as small as approximately 1/10 to 1/100 compared with that used in a conventional technique. This is particularly advantageous in searching conditions for the surface treatment of quantum dots under development which have inconsistent quality. Further, since quantum dots and surface modifiers are mostly expensive, reducing the amount of a reagent used for one experiment using the containment receptacle is advantageous also in terms of cost.

Subsequently, in this embodiment, in Step ST3 shown in FIG. 1, surface modification is performed. Here, a different surface modifier is added to each QD liquid. For example, in Experiment 1 to be described below, eight surface modifiers (surfactants) are used.

In this embodiment, the surface modification conditions can be varied by the following factors. For example, (1) the kind of a modifier, (2) the concentration of the surface modifier, (3) the concentration of a solvent in surface modification, (4) incubation time, etc.

As shown in FIG. 1, in surface modification, under different conditions, surface modifiers and a solvent are added (Step ST3-1), followed by incubation (Step ST3-2).

Note that the addition of surface modifiers can be performed in two or more steps as in Experiment 2 and Experiment 3 to be described below. Alternatively, the solvent for the surface modifiers is not necessarily used (i.e., the surface modifiers may be directly added to the QD liquid). Further, for the solvent, a solvent in which quantum dots are dispersed and a surface modifier dissolves, such as toluene, is preferably used.

In this Step ST3, the QD liquid contained in each container can be surface-modified under a different condition.

The incubation can be performed using an oven or an incubator. For incubation, the temperature and the time are adjusted. In this embodiment, all the liquid portions contained in the respective containers can be incubated under the same temperature and time conditions at a time. For incubation, in order to prevent the segregation of surface modifiers due to the aggregation of QDs, the solution is preferably agitated using a shaker, a magnetic stirrer, or a minute stirring rod.

Further, ultrasonic dispersion is preferably performed, since the aggregation can be reduced in a shorter time, and the homogeneity of the solution in the wells is improved. Moreover, different incubation conditions can be applied to samples prepared under the same conditions by incubating the samples on a hot plate with a temperature gradient as necessary.

Note that the shaking, agitation, ultrasonic treatment, and the like may be performed after the addition of the surface modifiers and the solvent before the incubation. In this case, the agitation may be facilitated by heating the samples to 40° C. to 100° C. to reduce the viscosity of the medium. Before, during, or after the incubation, vacuum degassing can optionally be performed to remove low-boiling impurities such as water and volatile contaminants, and a dispersion medium used in the nanoparticle suspension (such as toluene). Also in this case, the solvent can easily be removed by performing heating as necessary.

Next, in Step ST4 shown in FIG. 1, a flocculant is added after the incubation. The flocculant is not limited as long as it is a solvent having a polarity different from the surface polarity of the quantum dots. For example, when the quantum dots and surface modifiers are dispersed in a CFC-based solvent, toluene serves as a flocculant. Alternatively, alcohols such as ethanol may serve as a flocculant.

Next, in Step ST5 shown in FIG. 1, the quantum dots are obtained by filtration or settlement followed by the removal of the supernatant. Thus, surface-modified quantum dots can be obtained. For example, Step ST5 can be performed after repeating the addition of a flocculant and centrifugal separation. Here, the flocculants used in the repeated steps may be the same or different. It should be noted that whether Step ST4 and Step ST5 are performed or not can be determined as appropriate.

Next, in Step ST6 shown in FIG. 1, a dispersion medium is mixed with the surface-modified quantum dots contained in each container to prepare evaluation samples. The mixing is performed using for example a microplate shaker. In this embodiment, all the evaluation samples can be mixed at the same time. Thus, in this embodiment, a number of evaluation samples to which different surface modification conditions are applied can be prepared at a time.

Next, in Step ST7 shown in FIG. 1, the evaluation samples are evaluated by optical analysis. The evaluation can be performed primarily by absorption spectroscopy and fluorescence spectroscopy. Thus, the dispersibility and fluorescence characteristics of the quantum dot can be evaluated. For absorption spectroscopy and fluorescence spectroscopy, more desirably, absorption spectra and fluorescence spectra are obtained, since information such as the degree of dissolution of quantum dots and the dissolution rate, the cause of fluorescence quenching (dissolution or other causes), dissolution of additives and the interaction of the additives with QDs, and the rates of the dissolution and the interaction can be obtained at the same time from the change in the shape of the absorption spectra and the fluorescence spectra.

The evaluation can be performed focusing on the absorbance determined by fluorescence spectroscopy. Specifically, heavy aggregation of quantum dots increases scattering of light, resulting in low transmittance. For example, in the absorption spectrum measured for such quantum dots, the baseline is high. Especially in the case of absorption spectroscopy, an absorption peak (edge) wavelength can be correlated with the particle size of the quantum dots, and disappearance of the peak means the removal of quantum dots from the optical path, by such phenomena as the dissolution of the quantum dots, or phase separation.

On the other hand, when LEDs are used as a light source, the dispersibility of quantum dots can be evaluated provided that the intrinsic absorbance of a sample itself (the sum of the absorbance of the QDs and the absorbance of the dispersion medium used in combination) does not exceed an absorbance of 0.1 or less by 0.1 or more for a wavelength. Further, a sample can be determined not to have undergone dissolution of quantum dots and phase separation when the absorbance for the excitation wavelength is not significantly reduced (specifically, not reduced by 10% or more). Note that the base line and the disappearance of the peak can be evaluated in comparison with an evaluation sample used as a reference (reference sample). For example, the reference sample may be quantum dots dispersed in a good solvent such as toluene, which have not been surface-modified.

Further, when the above intrinsic absorbance of the sample itself for most wavelengths is 0.1 or less, shorter wavelengths are better since the scattering intensity is high. In particular, the evaluation can be performed provided that the absorbance for visible light having a wavelength of 720 nm or less is 0.1 or less.

Further, the fluorescence intensity obtained by fluorescence spectroscopy can be evaluated by examining if it is reduced to a fluorescence intensity lower, substantially equal to, or higher than the fluorescence intensity of the reference sample, or how much higher or lower it is compared with the fluorescence intensity of the reference sample.

Since optical analysis for the evaluation allows for rapid measurements, different evaluation samples can be swiftly evaluated. Accordingly, the time required for evaluating the characteristics of a large number of evaluation samples stored in the containment receptacle can be reduced compared with that required for conventional techniques.

Further, in this embodiment, a plurality of light emitting diodes arranged to face a plurality of containers can be used as a light source to perform the above-described evaluation. In this embodiment, a measurement can be performed by moving the samples between one light receiver and light emitting diodes. The above evaluation can also be performed using, as a light receiver, a plurality of light receiving elements arranged to face the plurality of containers. Thus, it is preferable to perform the above evaluation by optical analysis in a state where the light emitting diodes and the light receiver are placed to face one another with a predetermined distance from the containment receptacle of this embodiment so that the containment receptacle is vertically sandwiched. In this manner, a number of evaluation samples can be evaluated by optical analysis at a time, and the time required for searching surface modification conditions can more advantageously be reduced compared with that required for conventional techniques.

For the light emitting diodes, single color light emitting diodes may be used; alternatively, two color LEDs (multicolor LEDs as necessary) and an optical filter can be used in combination provided that the spectra of light emitted from the light emitting diodes do not overlap. In this case, the space and the amount of reagents used can be reduced using a structure in which a light receiver detects only light having wavelengths required for dispersibility evaluation or evaluation of dissolution and fluorescence intensity.

Further, when the optical analysis is continuously performed for a long time, the absorbance or change in the fluorescence intensity over time can be determined, so that the consistency of the sample over time can be checked.

For a light source for optical analysis used in this embodiment, a white light source such as a xenon lamp can be used; however, as described above, a plurality of light emitting diodes arranged to face a plurality of containers are preferably used as a light source to perform evaluation. The wavelength of the light emitting diodes used for absorbance evaluation may be a wavelength at which the absorbance of nanoparticles and a medium in which the nanoparticles are dispersed is 0.1 or less (i.e., when QDs emit visible light, 600 nm for green light emitting particles, 700 nm for red light emitting particles. To evaluate dissolution of particles and separation of the solvent, fluorescent nanoparticles which absorb light at a wavelength of light emitted from a fluorescence excitation light source to be described are preferably used.

In the case of fluorescence evaluation, wavelengths allowing for efficient and appropriate excitation of nanoparticles (i.e., 350 nm, 365 nm, 375 nm, 385 nm, 395 nm, 400 nm, 405 nm, 410 nm, 420 nm, 430 nm, 440 nm, 450 nm, and 460 nm) are preferred. Light emitting diodes for absorbance evaluation and light emitting diodes for fluorescence evaluation can be used at the same time; alternatively, they can be switched for use. In this embodiment, the spectra of fluorescence and the transmitted light can be determined and analyzed using a diffraction grating or the like. As described above, a plurality of light receiving elements arranged to face a plurality of containers are preferably used as a light receiver to perform the evaluation. In the case of fluorescence evaluation, in order to block light from the light emitting elements, an optical filter blocking light from the light emitting elements is preferably placed between the light emitting elements and the light receiving elements. In this manner, a number of evaluation samples can be evaluated at a time, and the time required for searching surface modification conditions can advantageously be reduced compared with that required for conventional techniques.

Thus, according to this embodiment, a nanoparticle suspension is divided for a plurality of containers and the nanoparticles in the containers can be surface-modified under various experimental conditions to prepare a plurality of evaluation samples of different sets of conditions. Further, those and other steps can be followed by evaluation of the evaluation samples by optical analysis in a series. Accordingly, in this embodiment, for example surface modification conditions can be studied using a number of evaluation samples at a time. Further, a certain treatment for surface modification can be uniformly performed on a large number of evaluation samples divided in a containment receptacle at a time. Thus, this embodiment can reduce the time required for searching surface modification conditions, also reduce the amount of samples and reagents, and facilitate controlling the conditions and evaluations, thereby effectively reducing labor.

In this embodiment, the above-described method for screening nanoparticles is implemented as a screening system. A screening system according to this embodiment includes a containment receptacle and a plurality of containers provided in the containment receptacle. A nanoparticle suspension is divided for the respective plurality of containers, nanoparticles are surface-modified under different conditions for the respective containers, a dispersion medium is added into each container to prepare evaluation samples in which the nanoparticles are mixed with the dispersion medium, and the evaluation sample in each container is evaluated by optical analysis.

Subsequently, the following specific experiments were carried out using the method for screening nanoparticles, shown in FIG. 1.

Experiment-1: Surface Modifiers for QD Dispersion in CFC Based-Solvent

Conditions for surface modification of CdSe-based quantum dots were studied considering the dispersibility of CdSe-based quantum dots used as a sealant for LEDs, in hexafluorometaxylene.

First, in Step ST1 of FIG. 1, a nanoparticle suspension (QD liquid) containing CdSe-based quantum dots was produced.

For example, compounds as materials for a Cd source and a Se source are dissolved to produce a CdSe-based precursor solution. The CdSe-based precursor solution was then reacted using a microreactor to synthesize CdSe-based quantum dots.

Subsequently, the surface of the CdSe-based quantum dots was coated with shells of ZnS and ZnSe. For example, the surface of the dots was coated with a first shell part made of ZnSe synthesized by reacting a material prepared from a Zn source and a Se source by continuous infusion. Next, the surface of the first shells was coated with a second shell part made of ZnS synthesized by reacting a material of ZnS by continuous infusion. A dispersion of thus produced CdSe-based quantum dots having a core/shell structure in toluene is added into the wells in a microwell plate made of glass (96 wells having a volume of 1.5 mL) by a predetermined amount (several ten microliters)(Step ST2). The concentration of the CdSe-based quantum dots is equal in each well.

Next, the CdSe-based quantum dots were surface-modified (Step ST3). The surface modifying species used here were eight modifiers in total consisting of two fluorobenzenethiol-based modifiers ($C_6H_4F$—SH, $C_6F_5$—SH), one fluoroalkyl alcohol-based modifier (($C_6F_{13}$)($C_2H_4$)OH), one perfluorocarboxylic acid-based modifier (($C_7F_{15}$)COOH), one fluoroalkanethiol-based modifier (($C_8F_{17}$)($C_2H_4$)SH), two fluoroalkyl amine-based modifiers (($C_8F_{17}$)($C_3H_6$)$NH_2$, ($C_7F_{15}$)($CH_2$)$NH_2$), and one fluoroalkyl ester-based modifier (($C_6F_{13}$)($C_2H_4$)OCOC($CH_2$)$CH_3$). The surface modifiers were used in three concentrations of 5%, 10%, and 20%. Toluene was used in three concentrations of 3%, 10%, and 20% in surface modification. Each concentration is expressed in percentage by mass. Hexafluorometaxylene was used as a solvent for the surface modifiers.

Next, incubation was performed. The incubation temperature was set to 40° C. The incubation time was set to 3 hours or 24 hours.

Subsequently, toluene was added as a flocculant (Step ST4) to cause the aggregation and the settlement of the quantum dots, and the supernatant was removed (Step ST5).

The resulting surface-modified CdSe-based quantum dots were mixed with hexafluorometaxylene as a dispersion medium to obtain evaluation samples (Step ST6).

The dispersibility and the fluorescence characteristics of the quantum dots were evaluated by visible-ultraviolet absorption spectroscopy and fluorescence spectroscopy using a microplate reader.

In the above experiment, the samples were prepared so that the quantum dots had the same concentration in the experimental conditions, so that the evaluation samples were relatively compared.

In this experiment, the quantum dots dispersed in toluene (not subjected to surface modification) was used as a reference sample, and the evaluation samples were relatively evaluated using the reference sample.

First, base lines and absorption peaks were studied based on the absorption spectra obtained by visible-ultraviolet absorption spectroscopy. Table 1 below shows the evaluation result of the dispersibility in each sample subjected to 3 hours of incubation. Table 2 shows evaluation result of the dispersibility in each sample subjected to 24 hours of incubation.

The cells in the first column in Table 1 and Table 2 show the surface modifiers added, and the upper cells in the top row show the concentrations of toluene in surface modification (toluene 0%, toluene 3%, toluene 10%, and toluene 30%). The numeric values of 5%, 10%, and 20% in the lower cells in the top row represent the concentrations of the surface modifiers.

"~" in Table 1 and Table 2 indicates that the base line was higher than that of the reference sample. A higher baseline indicates that the quantum dots were not dispersed well in the dispersion medium and were aggregated.

"-" in Table 1 and Table 2 indicates that no absorption peak was obtained because of the dissolution of quantum dots or the segregation of quantum dots caused by phase separation or heavy aggregation of quantum dots.

Meanwhile, "+" in Table 1 and Table 2 indicates that the sample satisfied the following criteria, i.e., the baseline is substantially equal to or lower than that of the reference sample, and the absorption at the absorption peak is equal to or higher than that of the reference sample.

As shown in Table 1 and Table 2, for all the eight surface modifiers, the quantum dots were found to be appropriately dispersed in hexafluorometaxylene as the dispersion medium with the absorption spectrum being equal to or higher than that of the reference sample, by controlling the toluene concentration and the surface modifier concentration under certain conditions.

The experimental results shown in Table 1 and Table 2 suggest that it is preferable to set the incubation time to 24 hours or less. Even when the incubation time was approximately 3 hours, preferred dispersibility was obtained. Accordingly, with a view to reducing the total evaluation time, the incubation time is more preferably set to 3 hours or less.

Next, the fluorescence intensity was studied based on the fluorescence spectra obtained by fluorescence spectroscopy. Table 3 below shows the evaluation result of the fluores-

TABLE 1

| Surface modifier | Toluene 0% | Toluene 3% | | | Toluene 10% | | | Toluene 30% | | |
| --- | --- | --- | --- | --- | --- | --- | --- | --- | --- | --- |
| | 10% | 20% | 10% | 5% | 20% | 10% | 5% | 20% | 10% | 5% |
| $C_6H_4F$-SH | + | + | − | − | + | + | ~ | + | + | + |
| $C_6H_5F$-SH | + | ~− | ~− | − | + | ~ | + | + | + | + |
| ($C_6F_{13}$)($C_2H_4$)OH | + | − | − | − | − | ~− | − | + | + | + |
| ($C_7F_{15}$)COOH | + | − | − | − | − | − | − | ~ | ~ | + |
| ($C_8F_{17}$)($C_2H_4$)SH | + | + | ~ | + | + | + | + | + | + | + |
| ($C_7F_{15}$)($CH_2$)$NH_2$ | ~ | ~ | ~ | + | ~ | ~ | + | + | ~ | ~ |
| ($C_7F_{15}$)($CH_2$)$NH_2$ | + | + | + | + | + | + | + | + | ~ | ~ |
| ($C_6F_{13}$)($C_2H_4$)OCOC($CH_2$)$CH_3$ | + | − | + | ~ | ~ | + | + | + | + | + |

TABLE 2

| Surface modifier | Toluene 0% | Toluene 3% | | | Toluene 10% | | | Toluene 30% | | |
| --- | --- | --- | --- | --- | --- | --- | --- | --- | --- | --- |
| | 10% | 20% | 10% | 5% | 20% | 10% | 5% | 20% | 10% | 5% |
| $C_6H_4F$-SH | + | − | − | − | + | + | ~ | + | + | + |
| $C_6H_5F$-SH | + | ~− | ~− | − | + | ~ | − | + | + | + |
| ($C_6F_{13}$)($C_2H_4$)OH | + | − | − | − | − | ~− | − | + | + | + |
| ($C_7F_{15}$)COOH | + | − | − | − | − | − | − | ~ | ~ | + |
| ($C_8F_{17}$)($C_2H_4$)SH | + | + | ~ | + | + | − | − | + | + | + |
| ($C_7F_{15}$)($CH_2$)$NH_2$ | ~ | ~ | ~ | + | ~ | ~ | − | + | ~ | ~ |
| ($C_7F_{15}$)($CH_2$)$NH_2$ | + | + | + | + | + | − | − | + | ~ | ~ |
| ($C_6F_{13}$)($C_2H_4$)OCOC($CH_2$)$CH_3$ | + | − | + | ~ | ~ | − | − | + | + | + | cence characteristics of each sample subjected to 3 hours of incubation. Table 4 shows the evaluation result of the fluorescence intensity of each sample subjected to 24 hours of incubation.

TABLE 3

| Surface modifier | Toluene 0% | Toluene 3% | | Toluene 10% | | | Toluene 30% | | |
|---|---|---|---|---|---|---|---|---|---|
| | 10% | 20% | 10% 5% | 20% | 10% | 5% | 20% | 10% | 5% |
| $C_6H_4F$-SH | − | ~ | − − | ~ | ~ | − | + | + | + |
| $C_6H_5F$-SH | − | − | − − | − | − | − | − | − | − |
| $(C_6F_{13})(C_2H_4)OH$ | − | − | − − | − | − | − | + | + | + |
| $(C_7F_{15})COOH$ | − | − | − − | − | − | − | − | ~ | + |
| $(C_8F_{17})(C_2H_4)SH$ | − | ~ | − − | ~ | − | ~ | − | ~ | + |
| $(C_7F_{15})(CH_2)NH_2$ | − | − | − − | − | − | − | − | − | − |
| $(C_7F_{15})(CH_2)NH_2$ | − | − | + + | + | + | − | + | − | − |
| $(C_6F_{13})(C_2H_4)OCOC(CH_2)CH_3$ | − | + | + + | + | + | + | + | + | + |

TABLE 4

| Surface modifier | Toluene 0% | Toluene 3% | | Toluene 10% | | | Toluene 30% | | |
|---|---|---|---|---|---|---|---|---|---|
| | 10% | 20% | 10% 5% | 20% | 10% | 5% | 20% | 10% | 5% |
| $C_6H_4F$-SH | − | − | − − | ~ | ~ | − | + | + | + |
| $C_6H_5F$-SH | − | − | − − | − | − | − | − | − | − |
| $(C_6F_{13})(C_2H_4)OH$ | − | − | − − | − | − | − | + | + | + |
| $(C_7F_{15})COOH$ | − | − | − − | − | − | − | − | ~ | + |
| $(C_8F_{17})(C_2H_4)SH$ | − | ~ | − − | ~ | − | ~ | − | − | + |
| $(C_7F_{15})(CH_2)NH_2$ | − | − | − − | − | − | − | − | − | − |
| $(C_7F_{15})(CH_2)NH_2$ | − | − | + + | + | + | − | + | − | − |
| $(C_6F_{13})(C_2H_4)OCOC(CH_2)CH_3$ | − | + | + + | + | + | + | + | + | + |

The cells in the first column in Table 3 and Table 4 show the surface modifiers added, and the upper cells in the top row show the concentrations of toluene in surface modification (toluene 0%, toluene 3%, toluene 10%, and toluene 30%). The numeric values of 5%, 10%, and 20% in the lower cells in the top row represent the concentrations of the surface modifiers.

"~" in Table 3 and Table 4 indicates that the fluorescence intensity was substantially the same as that of the reference sample. "-" in Table 3 and Table 4 indicates that the fluorescence intensity was lower than that of the reference sample. "+" in Table 3 and Table 4 indicates that the fluorescence intensity was higher than that of the reference sample.

Table 3 and Table 4 show that no light emission was observed when pentafluorobenzenethiol ($C_6F_5$—SH) and 4,4,5,5,6,6,7,7,8,8,9,9,10,10,10-heptadecafluoroundecylamine (($C_8F_{17}$)($C_3H_6$)$NH_2$) were used.

Further, Table 1 to Table 4 show that when fluorobenzenethiol ($C_6H_4F$—SH) was used, good dispersibility and good fluorescence intensity were obtained under conditions where the toluene concentration was 30% and the surface modifier concentration was 5% to 20%, irrespective of whether the incubation time was 3 hours or 24 hours.

Further, Table 1 to Table 4 show that when 3,3,4,4,5,5,6,6,7,7,8,8-tridecafluoro-1-octanol (($C_6F_{13}$)($C_2H_4$)OH) was used, good dispersibility and good fluorescence intensity were obtained under conditions where the toluene concentration was 30% and the surface modifier concentration was 5% to 20%, irrespective of whether the incubation time was 3 hours or 24 hours.

Further, Table 1 to Table 4 show that when perfluorooctanoic acid (($C_7F_{15}$)COOH) was used, good dispersibility and good fluorescence intensity were obtained under conditions where the toluene concentration was 30% and the surface modifier concentration was 5%, irrespective of whether the incubation time was 3 hours or 24 hours.

Further, Table 1 to Table 4 show that when 3,3,4,4,5,5,6,6,7,7,8,8,9,9,10,10,10-heptadecafluoro-1-decanethiol (($C_8F_{17}$)($C_2H_4$)SH) was used, good dispersibility and good fluorescence intensity were obtained under conditions where the toluene concentration was 30% and the surface modifier concentration was 5%, irrespective of whether the incubation time was 3 hours or 24 hours.

Further, Table 1 and Table 3 show that when 2,2,3,3,4,4,5,5,6,6,7,7,8,8,8-pentadecafluorooctylamine (($C_7F_{15}$)($CH_2$)$NH_2$) was used, good dispersibility and good fluorescence intensity were obtained under conditions where the toluene concentration was 3% and the surface modifier concentration was 5% or 10%, conditions where the toluene concentration was 10% and the surface modifier concentration was 10% or 20%, or conditions where the toluene concentration was 30% and the surface modifier concentration was 20%, irrespective of whether the incubation time was 3 hours or 24 hours.

Thus, it was found that when pentadecafluorooctylamine (($C_7F_{15}$)($CH_2$)$NH_2$) was used, the quantum dots were uniformly dispersed in a fluorine-based solvent and strong fluorescence intensity was obtained by adjusting the surface modifier concentration to a range of approximately 5% to 20% while the toluene concentration could take a wide range of values from as low as approximately 3% to approximately 30%.

Table 1 and Table 3 show that for propionic acid 3,3,4,4,5,5,6,6,7,7,8,8,8-tridecafluorooctyl (($C_6F_{13}$)($C_2H_4$)OCOC($CH_2$)$CH_3$), good dispersibility and good fluorescence intensity were obtained under conditions where the toluene concentration was 3% and the surface modifier concentration was 10%, conditions where the toluene concentration was 10% and the surface modifier concentration was 5% or 10%, or conditions where the toluene concentration was 30% and the surface modifier concentration was 5% to 20%, when the incubation time was 3 hours.

Table 2 and Table 4 show that when propionic aid 3,3,4,4,5,5,6,6,7,7,8,8,8-tridecafluorooctyl (($C_6F_{13}$)($C_2H_4$)OCOC($CH_2$)$CH_3$) was used, good dispersibility and good fluorescence intensity were obtained under conditions where the toluene concentration was 0% and the surface modifier concentration was 10%, conditions where the toluene concentration was 3% and the surface modifier concentration was 10%, conditions where the toluene concentration was 10% and the surface modifier concentration was 5% or 10%, or conditions where the toluene concentration was 30% and the surface modifier concentration was 5% to 20%.

The time required for the above experiments and evaluations was slightly more than one day, and approximately 100 sets of conditions were searched. Further, the dispersibility of quantum dots in fluorine-based polymers was further studied using quantum dots dispersed in fluorine-based solvents as in the above experiment process. Quantum dots were found to be dispersed in fluorine-based polymers without the aggregation of quantum dots while good fluorescence intensity was achieved, under certain conditions.

Here, the microwell plate used in the above experiments had 96 wells (indentations) arranged in a matrix. In the experiments, the same surface modifier was added into the wells arranged in the row direction (lateral direction) in the matrix; and different surface modifiers were added into the wells arranged in the column direction (longitudinal direction). The cells containing "+", "-", and "~" in Table 1 to Table 4 above correspond to the wells. As in Table 1 to Table 4, the cells arranged in the lateral direction show the results of experiments using the same surface modifier, the cells arranged in the longitudinal direction show the results of experiments using eight different surface modifiers.

In the experiments, the same surface modification conditions (except for the kind of the surface modifier) were applied to the wells arranged in the column direction (longitudinal direction) in the matrix, whereas different surface modification conditions (except for the kind of the surface modifier) were applied to the wells arranged in the row direction (lateral direction). Accordingly, as shown in Table 1 to Table 4, the cells arranged in the longitudinal direction contain the results of experiments under the same surface modification conditions (except for the kind of the surface modifier), whereas the cells arranged in the lateral direction contain the results of experiments under different surface modification conditions (except for the kind of the surface modifier).

Thus, the surface modifiers and the surface modification conditions were adjusted on a column-by-column basis or on a row-by-row basis, thereby facilitating the control and effectively reducing labor.

Experiment-2: Surface Modifiers for QD Dispersion in CFC Based-Solvent

The following evaluation samples were produced using a QD liquid obtained by washing 3 mL of the neat CdSe-based quantum dot liquid prepared in Experiment 1 above with ethanol and mixing the liquid with 100 μL of toluene.

(Evaluation Sample 1)

The QD liquid was divided for a plurality of containers by 10 μL followed by the addition of 50 μL of a solvent, 5 μL of decanethiol (fluoroalkyl amine-based modifier), and 1 μL of undecylamine (fluoroalkyl amine) in this order. The QD liquid portions were dispersed by a vortex mixer, followed by filtration. This was followed by mixing of 50 μL of a fluorine-based resin solution and drying.

(Evaluation Sample 2)

The QD liquid was divided for a plurality of containers by 10 μL, followed by the addition of 5 μL of decanethiol, 1 μL of undecylamine, and 50 μL of a solvent in this order. The QD liquid portions were dispersed by a vortex mixer, followed by filtration. This was followed by mixing of 50 μL of a fluorine-based resin solution and drying.

For the solvents added to the evaluation samples, three solvents Novec 7200 (A) (Novec is a registered trademark in Japan, other countries, or both), FC72/Novec 7200 (addition ratio: 1/1) (B), and FC72 (C) were used.

The absorbance, the fluorescence peak, the fluorescence area, area/absorbance, and the ratio of dispersion in toluene in each evaluation sample were determined. Note that FC72 refers to $C_6F_{14}$. The experimental results are shown in Table 5 below.

TABLE 5

|  | Absorbance 365 nm | Absorbance 700 nm | Fluorescence peak | Fluorescence area | Area/ Absorbance | Toluene dispersion ratio |
| --- | --- | --- | --- | --- | --- | --- |
| Toluene dispersion | 1.506 | 0.079 | 574 | 3029051 | 2011322 | 1 |
| 1-A | 1.428 | 0.068 | 581 | 1747495 | 1223736 | 0.608 |
| 1-B | 1.226 | 0.041 | 579 | 1842488 | 1502845 | 0.747 |
| 1-C | 1.368 | 0.031 | 575 | 2466097 | 1802702 | 0.896 |
| 2-A | 1.222 | 0.049 | 580 | 1737461 | 1421817 | 0.707 |
| 2-B | 1.231 | 0.04 | 578 | 2048953 | 1664462 | 0.828 |
| 2-C | 1.019 | 0.038 | 576 | 2408250 | 2363346 | 1.175 |

The toluene dispersion in Table 5 refers to a QD liquid which was not subjected to surface modification. "1" of "1-A" in the first column of Table 5 represents Evaluation sample 1, and "A" thereof represents Novec 7200 (A) that was a solvent. The other expressions in the first column follow this rule.

As shown in Table 5, in comparison with Evaluation sample 1, Evaluation sample 2 obtained by adding decanethiol before the addition of undecylamine, followed by dispersion in a solvent, had lower absorbance and exhibited a comparable fluorescence peak.

Thus performed screening method made it possible to more easily and faster find surface modification conditions allowing for good dispersibility of quantum dots in a fluorine-based resin and a fluorescence intensity higher than that of quantum dots dispersed in toluene (no surface modifier was added) by using two surface modifiers, i.e., decanethiol and undecylamine in combination and by controlling the order of addition.

Experiment 3: Surface Modifiers for QD Dispersion in CFC Based-Solvent

The following evaluation samples were produced using a QD liquid obtained by a first washing of 2.4 mL of the neat CdSe-based quantum dot liquid produced in Experiment 1 above with 7.2 mL of ethanol, followed by a second washing using 3.2 mL of ethanol and mixing of the liquid with 60 μL of toluene.

(Evaluation Sample 3)

The QD liquid was divided for a plurality of containers by 50 μL, followed by the addition of 5 μL of decanethiol, 1 μL of undecylamine, and $C_6F_{14}$ as a solvent (250 (D) in this order. The QD liquid portions were dispersed by a vortex mixer, followed by centrifugation resulting in phase separation. The lower phase was extracted and subjected to filtration. This was followed by mixing of 50 μL of a fluorine-based resin solution and drying.

(Evaluation Sample 4)

The QD liquid was divided for a plurality of containers by 10 μL, followed by the addition of 5 μL of decanethiol, 2 μL of undecylamine, and $(C_3F_7)_3N$ as a solvent (50 μL) (E) in this order. The QD liquid portions were dispersed by a vortex mixer, followed by centrifugation resulting in phase separation. The lower phase was extracted and subjected to filtration. This was followed by mixing of 50 μL of a fluorine-based resin solution and drying.

The absorbance, the absorption peak, the fluorescence peak, the fluorescence area, and area/absorbance of each evaluation sample were determined. The experimental results are shown in Table 6 below.

TABLE 6

| | Absorbance 365 nm | Absorbance 700 nm | Absorption peak | Fluorescence peak absorbance | Fluorescence peak | Absorbance 525 nm | Fluorescence area | Area/ Absorbance |
|---|---|---|---|---|---|---|---|---|
| 4 (before drying) | 2.192 | 0.002 | 560 | 0.714 | 581 | 0.626 | 7774377 | 12419132 |
| 4 (after drying) | 1.811 | 0.004 | 562 | 0.456 | 583 | 0.413 | 5554008 | 13447961 |
| 3 (before drying) | 2.217 | −0.021 | 560 | 0.678 | 583 | 0.596 | 7238148 | 12144544 |
| 3 (after drying) | 2.072 | −0.001 | 562 | 0.525 | 583 | 0.474 | 4273447 | 9015710 |

Figure 2:
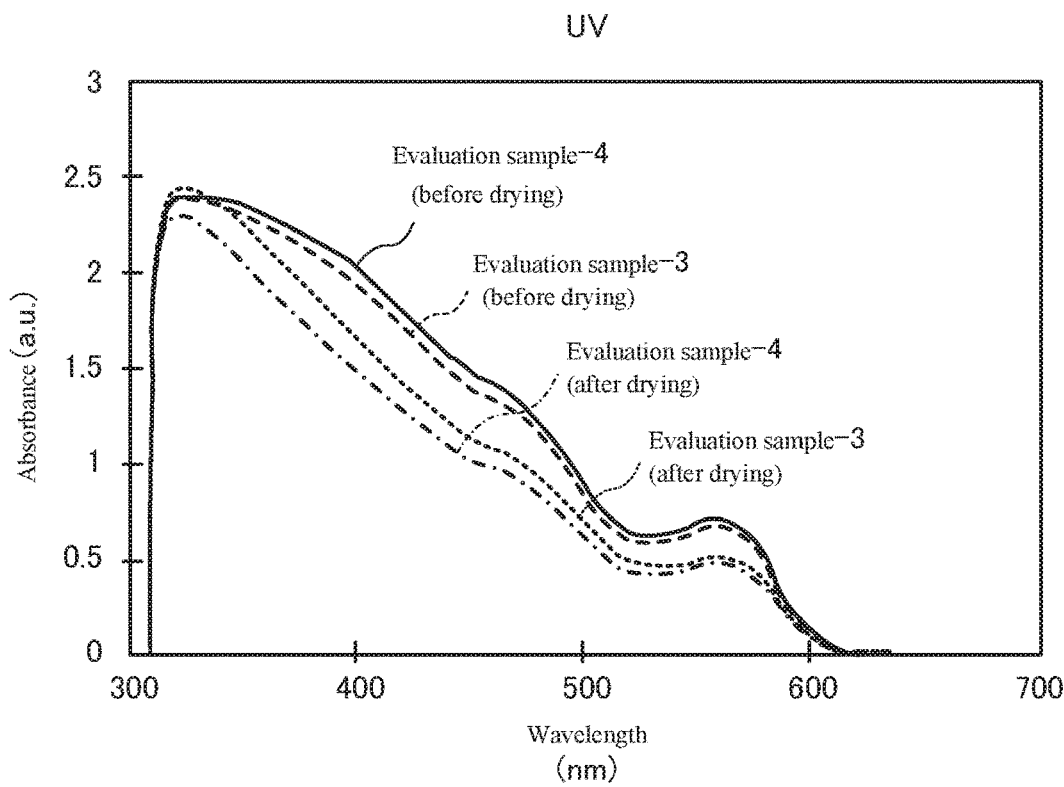
FIG. 2 is a graph showing the relationship between the wavelength and the absorbance measured for evaluation samples in Experiment 3.
Figure 3:
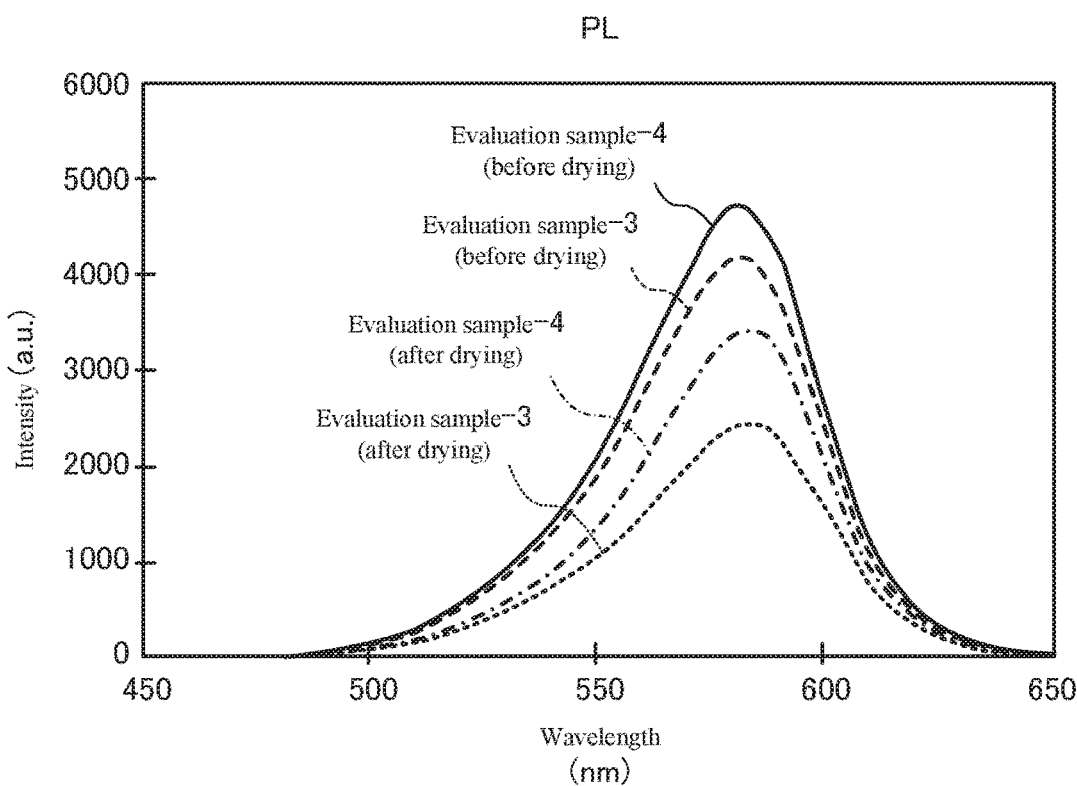
FIG. 3 is a graph showing the relationship between the wavelength and the intensity measured for evaluation samples in Experiment 3.

"3" and "4" in Table 6 denote numbers assigned to Evaluation samples 3 and 4. FIG. 2 is a graph showing the relationship between the wavelength and the absorbance measured for evaluation samples in Experiment 3. FIG. 3 is a graph showing the relationship between the wavelength and the intensity measured for evaluation samples in Experiment 3.

The experiments demonstrated that Evaluation sample 4 using $(C_3F_7)_3N$ as a solvent had larger fluorescence area, higher intensity, and less reduction in the intensity after drying in comparison with Evaluation sample 3.

Thus performed screening method made it possible to more easily and faster find surface modification conditions allowing for good dispersibility of quantum dots in a fluorine-based resin and high fluorescence intensity by using two surface modifiers, i.e., decanethiol and undecylamine in combination and by selecting the solvent.

In this embodiment, as described above, after deriving surface modification conditions for increasing the dispersibility in a CFC-based solvent, nanoparticles are produced based on the surface modification conditions.

The method for producing nanoparticles according to this embodiment includes the steps of: producing nanoparticles; and surface-modifying the nanoparticles by adding at least one surface modifier selected from the group consisting of fluorobenzenethiol-based, fluoroalkyl alcohol-based, perfluorocarboxylic acid-based, fluoroalkanethiol-based, fluoroalkyl amine-based, and fluoroalkyl ester-based modifiers.

In this embodiment, based on the above screening method, the surface modification conditions include, in addition to selecting a surface modifier, adjusting the solvent concentration in surface modification and the concentration of a surface modifier. "Adjusting" includes not only changing or fine adjusting based on the factors of the production process but also continuing to use the surface modifier or the concentration determined by the screening method.

Further, the kind of the surface modifier, the solvent concentration in surface modification, and the concentration of the surface modifier can be determined easily and appropriately by evaluating, by spectroscopy, a plurality of evaluation samples prepared under different surface modification conditions in the above screening method.

Features of the present invention will now be described.

A method for screening nanoparticles according to the present invention includes the steps of: dividing a nanoparticle suspension for a respective plurality of containers provided in a containment receptacle; performing surface modification on nanoparticles under different conditions for the respective containers; preparing evaluation samples by adding a dispersion medium into each container and mixing the nanoparticles and the dispersion medium; and performing evaluation on the evaluation sample in each container by optical analysis.

According to the present invention, a nanoparticle suspension is divided for a plurality of containers and surface modification can be performed on the nanoparticles in the containers under various experimental conditions to prepare a plurality of evaluation samples of different sets of conditions. Further, those and other steps can be followed by evaluation of the evaluation samples, for example, evaluation of the absorbance, the fluorescence wavelength, and the intensity by optical analysis, in a series. Accordingly, the present invention makes it possible to study, for example, experimental conditions using a number of evaluation samples at a time. Further, a certain treatment for surface modification can be uniformly performed on a large number of evaluation samples divided in a containment receptacle at a time. Thus, compared with conventional techniques, the present invention can reduce the time required for searching surface modification conditions and facilitate controlling the conditions and evaluations, thereby effectively reducing labor.

According to the present invention, preferably, in the evaluation, an absorption spectrum and a fluorescence spectrum of the sample in each container are measured to evaluate dispersibility and fluorescence characteristics of the nanoparticles.

In the present invention, 20 μL or less of the nanoparticle suspension is preferably added into each of 50 or more containers. Thus, a significantly small amount of nanoparticle suspension is introduced into each of 50 or more containers to perform surface modification, so that evaluation samples can be prepared using a small amount of nanoparticles and a large number of evaluation samples can be evaluated. This can effectively reduce time and cost expended in screening.

According to the present invention, preferably, the containment receptacle is made of a material having good thermal conductivity, and a step of incubation is performed simultaneously on the nanoparticles contained in the respective containers. Thus, all the nanoparticles contained in the respective containers can be simultaneously subjected to a step of incubation. Since the containment receptacle has good thermal conductivity, heat can be uniformly conducted throughout the entire receptacle, the nanoparticles can be treated under uniform incubation conditions, and rapid and accurate screening can be performed.

According to the present invention, preferably, vacuum degassing is performed before, during, or after the incubation step.

According to the present invention, preferably, the containers constitute detachable individual receptacles, and the individual receptacles can be detached from the containment receptacle for individual treatments. In this manner, in the present invention, the containers can be detached as individual receptacles from the containment receptacles, and the steps can be divided into steps in which treatment is performed with all the individual receptacles being set in the containment receptacle and steps in which treatment is performed individually, depending on the experimental conditions, the evaluation conditions, and the like. Thus, nanoparticles can be efficiently screened.

According to the present invention, preferably, the containers are arranged in a matrix; the same surface modifier is used for the containers arranged in either ones of rows or columns and different surface modifiers are used for the containers arranged in the other of the rows and columns; and the same surface modification conditions other than the surface modifiers are used for the containers arranged in the said others of the rows and columns, and different surface modification conditions are used for the containers arranged in the said ones of rows or columns. Thus, the surface modifiers and the surface modification conditions were adjusted on a column-by-column basis or on a row-by-row basis, thereby facilitating the control and effectively reducing labor.

According to the present invention, the evaluation is preferably performed using, as a light source, a plurality of light emitting diodes arranged to face the plurality of containers. According to the present invention, the evaluation is preferably performed using, as a light receiving unit, a plurality of light receiving elements arranged to face the plurality of containers. In this manner, a number of evaluation samples can be evaluated at a time, and the time required for searching surface modification conditions can advantageously be reduced compared with that required for conventional techniques.

A system for screening nanoparticles according to the present invention includes a containment receptacle and a plurality of containers provided in the containment receptacle. A nanoparticle suspension is divided for the respective plurality of containers, nanoparticles are surface-modified under different conditions for the respective containers, a dispersion medium is added into each container to prepare evaluation samples in which the nanoparticles are mixed with the dispersion medium, and the evaluation sample in each container is evaluated by optical analysis. Compared with conventional systems, the screening system of the present invention can reduce the time required for searching surface modification conditions and facilitate managing the conditions and evaluations, thereby effectively reducing labor.

Nanoparticles of the present invention are surface-modified by at least one surface modifier selected from the group consisting of fluorobenzenethiol-based, fluoroalkyl alcohol-based, perfluorocarboxylic acid-based, fluoroalkanethiol-based, fluoroalkyl amine-based, and fluoroalkyl ester-based modifiers. Specifically, it is preferred that in the above surface modifiers, alkane alcohol forming the fluoroalkyl alcohol-based modifier is an octanol, carboxylic acid forming the perfluorocarboxylic acid-based modifier is an octanoic acid, alkanethiol forming the fluoroalkanethiol-based modifier is a decanethiol, alkane amine forming the fluoroalkyl amine-based modifier is an octylamine, alkane ester forming the fluoroalkyl ester-based modifier is an octyl propionate.

The dispersibility of the nanoparticles in a CFC-based solvent can be improved by surface-modifying the nanoparticles with the above surface modifiers.

According to the present invention, the surface modifier is preferably selected from pentadecafluorooctylamine and tridecafluorooctyl propionate.

According to the present invention, at least two different surface modifiers may be used in combination. In this case, a surface modifier having decanethiol and a surface modifier having undecylamine are preferably used in combination. Further, the surface modifier having decanethiol is added first, followed by addition of the surface modifier having undecylamine, so that good dispersibility is achieved and the fluorescence intensity can be increased.

In the present invention, the nanoparticles are preferably CdSe-based quantum dots. Quantum dots according to the present invention can be suitably used for example as sealants for LEDs.

In the present invention, the nanoparticles are preferably fluorescent quantum dots. According to the present invention, the dispersibility of nanoparticles in a CFC-based solvent can be improved, the fluorescence intensity of nanoparticles can be increased, and they can be suitably used as fluorescent nanoparticles.

A method for producing nanoparticles according to the present invention includes the steps of: producing nanoparticles; and surface-modifying the nanoparticles by adding at least one surface modifier selected from the group consisting of fluorobenzenethiol-based, fluoroalkyl alcohol-based, perfluorocarboxylic acid-based, fluoroalkanethiol-based, fluoroalkyl amine-based, and fluoroalkyl ester-based modifiers. Surface modification according to the present invention allows for appropriate and easy production of nanoparticles having good dispersibility in CFC-based solvents.

According to the present invention, preferably, the surface modification conditions include selection of the surface modifier, and adjustment of the concentration of a solvent in surface modification and the concentration of the surface modifier. Thus, the surface modification conditions for increasing the dispersibility in CFC-based solvents can be fulfilled, and nanoparticles having good dispersibility in CFC-based solvents can more effectively be produced.

Preferably, the method according to the present invention further includes, after the step of the surface modification, a step of evaluating the nanoparticles by spectroscopy is performed, the kind of the surface modifier, the concentration of the solvent in the surface modification, and the concentration of the surface modifier are determined by evaluating, by spectroscopy, a plurality of evaluation samples subjected to surface modification under different conditions. Thus, a plurality of evaluation samples subjected to surface modification under different conditions can be evaluated by optical analysis at a time, and a search for finding optimum surface modification conditions can be conducted in a short time. This leads to reduction in the time spent for the production process of nanoparticles. Further, nanoparticles can be produced under optimum surface modification conditions, and nanoparticles having desired properties can be produced at a high yield.

INDUSTRIAL APPLICABILITY

Compared with conventional methods and systems, a method and a system for screening nanoparticles, according to the present invention can reduce the time required for searching surface modification conditions and facilitate controlling the conditions and evaluations, thereby effectively reducing labor. This allows for a search of suitable surface modification conditions in using nanoparticles and a polymer, or the like in combination.

Further, nanoparticles of the present invention have good dispersibility in CFC-based solvents (including resin solutions). Accordingly, the surface-modified nanoparticles of the present invention can be preferably used for example as sealants for LEDs.

This application is based on Japanese patent application No. 2015-169736 filed on Aug. 28, 2015 and Japanese patent application No. 2015-169739 filed on Aug. 28, 2015, the contents of which are hereby incorporated in their entirety.

The invention claimed is:

1. A method for screening nanoparticles, comprising:
dividing a nanoparticle suspension for a respective plurality of containers provided in a containment receptacle;
performing surface modification on nanoparticles for the respective containers;
incubating all the nanoparticle suspensions at one time under same conditions;
preparing evaluation samples by adding a dispersion medium into each container and mixing the nanoparticles and the dispersion medium; and
performing evaluation on the evaluation sample in each container by optical analysis,
wherein the containers are arranged in a matrix, a same surface modifier is used for the containers arranged in either ones of rows or columns and different surface modifiers are used for the containers arranged in the other of the rows and columns, and same surface modification conditions other than the surface modifiers are used for the containers arranged in the other of the rows and columns, and different surface modification conditions are used for the containers arranged in the ones of rows or columns,
wherein the surface modifiers and the surface modification conditions are adjusted on a column-by-column basis or on a row-by-row basis,
wherein the evaluation is performed using a plurality of light emitting diodes, as a light source, arranged to face the plurality of containers, using a plurality of light receiving elements, as a light receiving unit, arranged to face the plurality of containers, and
wherein the light emitting diodes and the light receiving elements are provided to face each other with a predetermined distance from the containment receptacle.

2. The method for screening nanoparticles according to claim 1, wherein in the evaluation, an absorption spectrum and a fluorescence spectrum of the sample in each container are measured to evaluate dispersibility and fluorescence characteristics of the nanoparticles.

3. The method for screening nanoparticles according to claim 1, wherein 20 µL or less of the nanoparticle suspension is added into each of 50 or more containers.

4. The method for screening nanoparticles according to claim 1, wherein the containment receptacle is made of a material having good thermal conductivity, and the method further comprises simultaneously incubating the nanoparticles contained in the respective containers.

5. The method for screening nanoparticles according to claim 4, wherein vacuum degassing is performed before, during, or after the incubation.

6. The method for screening nanoparticles according to claim 1, wherein the containers constitute detachable individual receptacles, and the individual receptacles can be detached from the containment receptacle for individual treatments.

* * * * *